United States Patent
Cooper et al.

(10) Patent No.: US 9,861,963 B2
(45) Date of Patent: Jan. 9, 2018

(54) PREPARATION OF CATALYST

(71) Applicant: Shell Oil Company, Houston, TX (US)

(72) Inventors: David Allen Cooper, Morrisville, PA (US); Sjoerd Alkema, Delfzil (NL); Lay Hwa Ong, Amsterdam (NL); Bart Pelgrim, Amsterdam (NL); Laszlo Domokos, Amsterdam (NL); Ferry Winter, Amsterdam (NL)

(*) Notice: Subject to any disclaimer, the term of this patent is extended or adjusted under 35 U.S.C. 154(b) by 94 days.

(21) Appl. No.: 14/132,741

(22) Filed: Dec. 18, 2013

(65) Prior Publication Data

US 2014/0183098 A1   Jul. 3, 2014

Related U.S. Application Data

(60) Provisional application No. 61/746,203, filed on Dec. 27, 2012.

(51) Int. Cl.
| | | |
|---|---|---|
| *B01J 21/12* | (2006.01) | |
| *C10G 47/16* | (2006.01) | |
| *C10G 47/20* | (2006.01) | |
| *B01J 23/888* | (2006.01) | |
| *B01J 37/03* | (2006.01) | |
| *B01J 37/20* | (2006.01) | |
| *B01J 35/10* | (2006.01) | |
| *B01J 37/00* | (2006.01) | |
| *B01J 37/02* | (2006.01) | |
| *C10G 47/12* | (2006.01) | |
| *C10G 47/14* | (2006.01) | |

(52) U.S. Cl.
CPC .............. *B01J 23/888* (2013.01); *B01J 21/12* (2013.01); *B01J 35/1019* (2013.01); *B01J 35/1042* (2013.01); *B01J 35/1047* (2013.01); *B01J 37/0009* (2013.01); *B01J 37/0203* (2013.01); *B01J 37/03* (2013.01); *B01J 37/036* (2013.01); *B01J 37/20* (2013.01); *C10G 47/12* (2013.01); *C10G 47/14* (2013.01)

(58) Field of Classification Search
CPC ............ B01J 21/12; C10G 47/16; C10G 47/20
See application file for complete search history.

(56) References Cited

U.S. PATENT DOCUMENTS

| | | | |
|---|---|---|---|
| 5,208,006 A * | 5/1993 | Kuznicki ................. | B01J 29/89 208/119 |
| 6,399,530 B1 | 6/2002 | Chen et al. | |
| 2011/0000824 A1* | 1/2011 | Zhan ...................... | B01J 29/106 208/300 |
| 2012/0091034 A1 | 4/2012 | Dandeu et al. | |

FOREIGN PATENT DOCUMENTS

| | | | |
|---|---|---|---|
| CN | 101815577 | 8/2010 | |
| CN | 102029192 | 1/2013 | |
| WO | 2009029579 | 3/2009 | |
| WO | 2009029580 | 3/2009 | |
| WO | WO 2009029580 A2 * | 3/2009 | .............. B01J 21/12 |

OTHER PUBLICATIONS

International Search Report dated Apr. 4, 2014 for Application No. PCT/US2013/076016 filed Dec. 18, 2013.

\* cited by examiner

*Primary Examiner* — Randy Boyer
(74) *Attorney, Agent, or Firm* — Charles W. Stewart

(57) ABSTRACT

A process for preparing a hydrocarbon conversion catalyst that comprises a specially made silica-alumina composition and a metal or metal compound selected from Group VIB and Group VIII metals. The silica-alumina composition is made by preparing an aqueous mixture containing aluminum sulfate followed by adding alkali metal aluminate to the mixture to inhance the pH to within specified range and then adding aluminum sulfate to the mixture to lower the pH. Then alkali metal silicate is added followed by several other pH swings to provide a mixture containing silica-alumina. The resulting mixture is treated with an alkaline solution to provide a precipitate solid that is recovered to obtain a silica-alumina composition containing of from 30 to 70% wt silica and of from 70 to 30% wt of alumina.

11 Claims, No Drawings

PREPARATION OF CATALYST

This non-provisional application claims the benefit of U.S. Provisional Application No. 61/746,203, filed Dec. 27, 2012, which is incorporated herein by reference.

The present invention relates to a process for preparing a hydrocarbon conversion catalyst based on a silica-alumina composition containing of from 30 to 70% wt silica and of from 70 to 30% wt of alumina.

Processes for preparing silica-alumina compositions are well known in the art. A process which is especially desirable is the so-called pH swing preparation which allows amorphous silica-alumina to be manufactured in a single vessel by changing the pH of the reaction mixture and thereby precipitating silica and alumina. A disadvantage of the pH swing preparation methods is that the surface area of the silica-alumina obtained tends to be relatively low namely well below 300 $m^2$/grams. Such lower surface area tends to give lower activity while having as additional disadvantage that it can limit the metal content which can be incorporated.

A pH swing method for preparing amorphous silica alumina is described in WO-A-2009/029580. The amorphous silica alumina obtained is described to have a surface area from 225 to 325 $m^2$/g. Further information on the compositions obtained is given in WO-A-2009/029579 describing the compositions obtained to have greater than 51% of the pore volume in pores having a pore diameter greater than 350 Angstroms, more specifically greater than 54%. An upper limit is less than 90%, or less than 80%, or even less than 70%.

The aim of the present invention is to prepare a silica-alumina composition having a high surface area while still having the advantageous high macroporosity of the silica-alumina prepared by the method of WO-A-2009/029580.

The process of the present invention now relates to a process for preparing a hydrocarbon conversion catalyst, which process comprises:
(a) preparing an aqueous mixture containing aluminum sulfate and having a pH in the range of from 1.0 to 6.5;
(b) adding alkali metal aluminate to the mixture obtained in step (a) to increase the pH of the mixture to within the range of from 7.1 to 12;
(c) adding aluminum sulfate to the mixture obtained in step (b) to lower the pH of the mixture to within the range of from 1.5 to 6.5;
(d) adding alkali metal silicate to the mixture obtained in step (c) to increase the pH of the mixture to within the range of from 6.5 to 11,
wherein the final steps of the preparation process are
(v) adding aluminum sulfate to the mixture obtained in a process comprising steps (a)-(d) to lower the pH of the mixture to within the range of from 2 to 8;
(w) adding alkali metal silicate to the mixture obtained in step (v) to increase the pH of the mixture,
(x) adding to the mixture obtained in step (w) (i) alkali metal aluminate to change the pH of the mixture to of from 7.8 to 12 and (ii) aluminum sulfate to change the pH of the mixture to within the range of from 1.5 to 7.7, wherein step (i) can precede or succeed step (ii),
(y) treating the mixture obtained in step (x) with an alkaline solution having a pH of from 7.5 to 12, and
(z) recovering a precipitate solid from the mixture obtained in step (y) to obtain a silica-alumina composition containing of from 30 to 70% wt silica and of from 70 to 30% wt of alumina,
and subsequently shaping the silica-alumina composition obtained and compositing the shaped silica-alumina composition with one or more metals or metal compounds which metals have been selected from the group consisting of Group VIB and Group VIII metals to obtain a hydrocarbon conversion catalyst.

An alternative process further comprises (e) adding aluminum sulfate to the mixture obtained in step (d) to lower the pH of the mixture to within the range of from 1.5 to 7.0 and (f) adding alkali metal aluminate to the mixture obtained in step (e) to increase the pH of the mixture to within the range of from 7.5 to 12.

Without wishing to be bound to any theory, it is thought that the improved surface area of silica-alumina prepared according to the present invention is due to the fact the that the final steps of the precipitation process consist of the addition of aluminum sulfate followed by silicate followed by the addition of aluminate and aluminum sulfate whereby the last two compounds can be added in any order.

Furthermore, it was found that the silica alumina obtained by the present invention contains a relatively large percentage of the alumina on the outside of the particles which can benefit deposition of base metals as well improve extrudability of the silica alumina obtained. The alumina on the outside furthermore was found to be relatively uniformly distributed while being tetrahedral coordinated aluminum which is expected to give rise to acidic sites with higher strength than penta-coordinated or octahedral coordinated aluminum.

An advantage of the process of the present invention itself is that it is reasonably simple and economical.

The alkali metal silicate and alkali metal aluminate applied in the present invention can comprise any alkali metal. Preferred alkali metals are potassium and sodium. Sodium is the most preferred alkali metal for both the silicate and the aluminate.

The process of the present invention involves the preparation of a mixture of water and aluminum sulfate followed by adding aluminate increasing the pH of the mixture, adding aluminum sulfate reducing the pH of the mixture, adding silicate increasing the pH of the mixture, optionally repeating the sequential addition of aluminum sulfate and aluminate, and rounding off the preparation process by adding aluminum sulfate followed by silicate followed by the addition of aluminate and aluminum sulfate which latter compounds are added in either order.

It is believed that this pH swing preparation method provides for the silica-alumina compositions having an increased surface area in combination with unique further physical and catalytic properties.

One of the advantageous features of the inventive pH swing process is that it allows for the use of a single vessel for carrying out the mixing and precipitation reaction of the process. It is noted that in many of the prior art processes for making silica-alumina, multiple processing tanks are required for conducting various steps of the processes, such as, for example, a gelling step may be carried out in a different vessel from one that is used to prepare a silica sol, and different vessels may also be used in carrying out certain of the other steps of the prior art processes. The inventive process, on the other hand, provides for the use of a single mixing or reaction zone into which the various components are added. This eliminates some of the manufacturing complexity that is often associated with the prior art silica-alumina manufacturing processes that require the use of multiple mixing, reaction and transfer tanks or vessels.

Another of the advantages of the inventive pH swing process is that it can significantly reduce the total preparation and precipitation time required for making the final slurry from which is recovered the precipitate solid that comprises the amorphous silica-alumina of the inventive process. The elapsed time for adding to the preparation mixture the components for each of the steps of the one or more pH swings can be minimized to provide for a short total precipitation time for the preparation of the final slurry that includes the precipitate solid. In many cases, the elapsed time for preparation of a final slurry can be significantly shorter than those of prior art processes. The process of the present invention from the first addition of aluminum sulfate to recovering the precipitate solids in step (z) can be carried out in a time frame of from 10 minutes to 6 hours, more specifically of from 15 to 350 minutes, more specifically of from 20 to 300 minutes, most specifically of from 30 to 200 minutes.

In general, the inventive method includes, initially, combining water and aluminum sulfate in such amounts as to provide a mixture that has a pH that is acidic, desirably in the range of from 1.0 to 6.5, and, preferably, from 1 to 6. Most preferably, the initial mixture should have a pH that is in the range of from 1.0 to 5.0, and, especially preferred, from 1.2 to 4.0.

Once this initial mixture is formed, the next step of the method includes adding an amount of aluminate to the initial mixture in such an amount as to increase the pH of the resulting mixture so that it is alkaline, preferably in the range of from 7.1 to 12, and, preferably, from 7.2 to 11. Most preferably, the pH is in the range of from 7.2 to 10.

These two process steps, which include a change in the mixture pH after the addition of the aluminum sulfate to lower the pH of the mixture followed by the separate addition of either the sodium aluminate or sodium silicate to increase the pH of the mixture, are, together, considered herein to be one pH swing.

The time elapsed between the two addition steps of the pH swing method does not need to be large, but it only needs to be sufficiently long so as to allow for the substantial mixing of the added components. In the case where the components are combined together within a single mixing zone, it is desirable for the mixing time to be sufficient to allow for mixing of the components to provide a substantially homogeneous preparation mixture. An important feature of the inventive method is in the application of multiple pH swings in the preparation of the preparation mixture that becomes the final slurry of a silica alumina composition which can be silica and alumina cogel, or, otherwise, a slurry of a precipitate solid comprising silica-alumina.

The mixing or reaction vessel can be any suitable vessel and associated equipment known to those skilled in the art including a vessel that is equipped with means for stirring the contents of the vessel, such as a rotating impeller, to provide for blending and dispersing of the components therein and suspending and dispersing of precipitate solids of the preparation mixture of the inventive method. The vessel may also be equipped with means for exchanging heat with the contents of the vessel in order to provide for the control of the temperature of the vessel contents.

It is desirable to minimize the time required for mixing the components of each addition step of the method to only that which is required to provide a homogenous mixture within the mixing zone. While the mixing time can vary depending upon the type of equipment utilized, the equipment size, and other factors, the time required to combine, blend and disperse the components should, generally, be in the range of from 1 to 30 minutes per addition step.

After the completion of the aforementioned pH swing, aluminum sulfate is again introduced into the mixing zone and mixed with the preparation mixture contained therein in an amount so as to lower its pH to within the range of from 1.5 to 6.5, preferably, from 2 to 6, most preferably, from 2.5 to 5.5, and, especially preferred, 3.1 to 5.1. This step is followed by the introduction of silicate into the mixing zone and mixing it with the preparation mixture therein in an amount so as to increase the pH of the mixture to within the range of from 6.5 to 11, preferably from 6.5 to 9.2, more preferably, from 7 to 8.8, and, most preferably, from 7.2 to 8.5, which completes the second pH swing.

After the completion of the second pH swing, the silica alumina composition obtained can be subjected to a further pH swing or can be subjected to the final steps of the preparation process.

If the silica alumina compositions are to be subjected to a further pH swing, this third pH swing will resemble the first pH swing. The optional third pH swing comprises again introducing aluminum sulfate into the mixing zone and mixing it with the preparation mixture contained therein in an amount so as to lower its pH to within the range of from 1.5 to 7.0, preferably, from 2 to 6, most preferably, from 2.5 to 5.5, and, especially preferred, 3.0 to 5.1. This step is followed by the introduction of aluminate into the mixing zone and mixing it with the preparation mixture therein in an amount so as to increase the pH of the mixture to within the range of from 7.5 to 12, preferably, from 8 to 11, and, most preferably, from 9 to 10, which completes the optional third pH swing.

The final steps of the process of the present invention are a one but last pH swing which resembles the second pH swing and the last pH swing which comprises the addition of aluminum sulfate and aluminate in either order.

In the one but last pH swing, aluminum sulfate is introduced into the mixing zone and mixed with the preparation mixture contained therein in an amount so as to lower its pH, preferably to a pH within the range of from 2 to 8, preferably, from 2.5 to 7.5. If the third pH swing step is applied, the pH in this one but last pH swing most preferably is from 3 to 7.5, more specifically from 4 to 7.5. If no third pH swing is applied and the mixture obtained in step (e) is used in step (w), the pH of the mixture obtained in step (v) is from 2.5 to 6, more specifically of from 2.5 to 5.

This step (v) is followed by the introduction of silicate into the mixing zone and mixing it with the preparation mixture therein in an amount so as to increase the pH of the mixture. If the third pH swing step is applied, the pH of the mixture obtained in step (w) preferably is from 6 to 10, more specifically from 7 to 9.5. If no third pH swing is applied, the pH of the mixture obtained in step (w) preferably is from 2.5 to 6, more specifically of from 2.5 to 5.

The last pH swing comprises (i) adding alkali metal aluminate in such amounts as to provide a mixture that has a pH, desirably in the range of from 7.8 to 12, and, preferably, from 7.8 to 11, and (ii) adding an amount of aluminum sulfate in such an amount as to provide a mixture having a pH to the range of from 1.5 to 7.7, and, preferably, from 2 to 7.7, more specifically of from 3 to 7.5.

Upon the completion of the last pH swing, the mixture is treated with alkaline solution, more specifically alkali metal hydroxide, most preferably sodium hydroxide. The pH of the alkaline solution is of from 7.5 to 12, more preferably of from 8 to 11. This treatment makes that the silica-alumina solids according to the present invention precipitate and separate from the solution. The final step involves recovering precipitate solids contained in the final slurry.

It is preferred to remove from the silica alumina composition any impurities and/or contaminants which may still be present. Impurities and/or contaminants which often will be present are alkali metals, more specifically sodium, and/or sulphates. Therefore, it is preferred for step (z) to additionally comprise removing undesirable components. Preferably, this is done by subjecting the recovered precipitate solid to washing and/or ion exchange. Each of these treatments can be carried out as often as required. In actual practice, the solids preferably are washed with water, subsequently subjected to ion exchange and subsequently again washed with water. The ion exchange preferably is carried out by treating the solids with an ion exchange solution more specifically a solution containing one or more from the group consisting of calcium salts, rare earth metal salts, strong acids such as hydrogen choride and sulphuric acid and ammonium salts, more specifically ammonium chloride and ammonium nitrate. The water wash and/or ion exchange can be repeated as often as required. It is preferred that the silica-alumina composition obtained has a sodium oxide content of at most 0.5% wt, more specifically at most 0.1% wt, based on total composition. Any sodium is considered to be present in the form of sodium oxide independent from its actual form.

The temperature conditions at which the preparation mixture is formed within the mixing zone of the inventive process can affect the properties of its silica-alumina end-product with higher preparation temperatures tending to yield material that is more crystalline and lower preparation temperatures tending yield material that is more amorphous. Thus, it can be desirable to control the mixing and reaction temperatures of the process steps to within certain defined temperature ranges. Generally, the mixing and reaction temperatures of each of the pH swings should be in the range of from 20° C. to 90 ° C., preferably, from 30° C. to 80° C., and, most preferably, from 40° C. to 70° C. It is especially desirable for the mixing and reaction of the components to take place in as close to isothermal conditions as is feasible with the use of typical commercial mixing and reaction process equipment.

In addition to the control of the mixture pH of the various addition steps of each of the pH swings, it is also desirable to combine the components in amounts such as to provide a final slurry mixture from which the precipitate solids are recovered that has a solids content of from 1 to 30 weight percent (wt. %), based upon the total weight of the preparation mixture. Preferably, the proportion of solids in the final slurry mixture is in the range of from 2 to 20 wt. %, and, most preferably, from 3 to 15 wt. %.

To provide for the desired weight percentage of precipitate solids in the final slurry of the inventive process the relative amounts of the aluminum sulfate, sodium aluminate and sodium silicate for each of the pH swings are adjusted within certain desired ranges. For example, in the pH swings that involve the addition of aluminum sulfate followed by the addition of sodium aluminate, the weight ratio of the sodium aluminate-to-aluminum sulfate for the components added to the preparation mixture should, generally, be in the range of from 0.1 to 1.5, but, preferably, from 0.3 to 1.1, and, most preferably, from 0.5 to 0.9. In the pH swings that involve the addition of aluminum sulfate followed by the addition of sodium silicate, the weight ratio of the sodium silicate-to-aluminum sulfate should, generally, be in the range of from 0.5 to 5, but, preferably, from 1 to 4, and, most preferably, from 1.5 to 3.

The form in which the aluminum sulfate, sodium aluminate and sodium silicate is added to the preparation mixture of the inventive process may be either as a dry solid or as an aqueous solution of the particular component.

Any suitable method known to those skilled in the art for separating the precipitate solids from the remaining fluid of the final slurry or preparation mixture may be used to recover the precipitate solid. Such methods include gravity separation, pressure separation, and vacuum separation and can include the use of equipment such as, for example, belt filters, plate-and-frame filters and rotary vacuum filters.

The filtered precipitate solids, or filter cake, obtained in step (z), are washed with water to remove impurities such as sodium and sulfate salts. The amount of water used to wash the precipitate solids may be any amount that suitably provides a washed powder having a pH that is within the desirable range of from 2 to 7, and, preferably, from 2.5 to 5.5. The weight ratio of water to dry powder used in a single washing step can be in the range of from 0.1:1 to 100:1, preferably, from 0.5:1 to 50:1. One or more washing steps may be used to wash the filtered precipitate solids.

The precipitate obtained in step (z) can be treated further by drying and/or calcining The precipitate obtained in step (z) may also be flash-dried, belt-dried or spray-dried using any of the suitable drying methods known to those skilled in the art. Preferably, the compositions are subjected to belt drying or flash drying.

The silica alumina composition obtained by the process of the present invention may further be processed by drying or calcination, or both. Drying may be carried out in air or any other suitable atmosphere under otherwise suitable drying conditions at a drying temperature in the range of from 50° C. to 200° C., preferably, from 60° C. to 180° C. The composition, preferably after having been dried, may be calcined under suitable calcination conditions, and, in particular, in an oxygen-containing atmosphere, such as, for example, air, at a calcination temperature in the range of from 250° C. to 1000° C., preferably, from 275° C. to 850° C., and, most preferably, from 300 to 850° C.

The silica-alumina composition can have a silica content that is in the range of from 30 to 70 weight percent, with the weight percent being based on the total dry weight of the silica-alumina composition. The preferred silica content, however, is in the range of from 40 to 60 weight percent. The alumina may be present in the silica-alumina composition in an amount in the range of from 30 to 70 weight percent, more specifically, from 40 to 60 weight percent.

A characteristic of the silica-alumina composition obtained by the present invention is that it has a significantly high surface area and total pore volume. Its surface area can be in the range of from 300 m$^2$/g to 500 m$^2$/g, but, more specifically, it is in the range of from 320 m$^2$/g to 450 m$^2$/g, and, more specifically, from 330 m$^2$/g to 420 m$^2$/g. The surface area is to be measured by the BET method according to ASTM test D3663-03.

The total pore volume of the amorphous silica-alumina composition is in the range of from 0.8 cc/gm to 1.3 cc/gm, more specifically, from 0.9 cc/gm to 1.2 cc/gm, and, most specifically, from 0.95 cc/gm to 1.1 cc/gm. The total pore volume is measured according to ASTM D6761-07(2012).

The silica alumina composition obtained by the present invention can be used as catalyst either as such or by further processing such as by shaping the composition in any way known to someone skilled in the art. A preferred method of shaping comprises mixing the composition, preferably the spray-dried powder, with water and extruding the mixture obtained. The shaped composition, preferably after having been dried, preferably is calcined in an oxygen containing atmosphere, preferably in air, at a calcination temperature in the range of from 400 to 1000° C., preferably from 500 to 900° C., most preferably of from 600 to 850° C.

Due to the specific properties of the silica alumina prepared by the present invention, it is found to be possible to extrude a mixture of silica alumina composition obtained by the present invention, water and an acid, more preferably an inorganic acid, most preferably nitric acid. Such extrusion is beneficial for the acidity of the material obtained especially if relatively high calcination temperatures are applied.

It is preferred to use the silica alumina as catalyst after having composited the silica alumina with one or more metals or metal compounds which metals have been selected from the group consisting of Group VIII metal and a Group VIB metals, as classified according to CAS notation as given in the Periodic Table published in the CRC Handbook of Chemistry and Physics, 63rd Edition, 1982, CRC Press, Inc.

Preferably, the Group VIII metal is selected from nickel, cobalt, platinum, palladium and mixtures thereof, more specifically is selected from from nickel, cobalt, a mixture of nickel and cobalt, platinum, palladium, and a mixture of platinum and palladium. The Group VIB metal is preferably selected from molybdenum and tungsten and mixtures thereof. In a preferred embodiment, the Group VIII metal is nickel and the Group VIB metal is molybdenum and/or tungsten, preferably molybdenum.

The amount of Group VIII metal and Group VIB metal in the catalyst may vary depending on the metal type and the intended purpose of the catalyst, however, the amount of Group VIII metal will preferably be in the range of from 0.1 to 10 wt %, whilst the amount of Group VIB metal will preferably be in the range of from 3 to 30 wt %, measured as the metal, based on total weight of catalyst. A preferred catalyst comprises nickel in an amount in the range of from 1 to 6 wt %, more preferably 3 to 6 wt %; and molybdenum in an amount in the range of from 6 to 19 wt %, preferably 10 to 16 wt %, or tungsten in an amount in the range of from 10 to 25 wt %, preferably 15 to 22 wt %. An alternative preferred catalyst comprises of from 0.1 to 5% wt of platinum and/or palladium. The latter catalyst has been found to give especially good results in cracking of synthetic feedstocks especially feedstock obtained via syngas preferably using the Fischer Tropsch process.

Phosphoric acid may be included in the catalyst. As phosphoric acid, anyone of metaphosphoric acid, pyrophosphoric acid, orthophosphoric acid, triphosphoric acid and tetraphosphoric acid may be used. A soluble salt of the acid such as nickel phosphate may also be used. The amount in the catalyst typically is 0.1-10 wt %.

The catalyst thus obtained can be useful in a wide variety of hydrocarbon processes, including, for example, hydrocracking, hydrotreating (e.g. hydrodesulfurization, hydrodenitrogenation, and hydrodemetalization), hydrodearomatization, hydrofinishing, isomerization, polymerization, catalytic dewaxing, and catalytic cracking. Possible feedstocks that can be processed or treated using the inventive amorphous silica-alumina include hydrocarbons that boil in the gasoline boiling range, distillate hydrocarbons, including diesel and kerosene, gas oils, including atmospheric gas oil and vacuum gas oil, atmospheric or vacuum residues, deasphalted oils, catalytically cracked cycle oils, coker gas oils and other thermally cracked gas oils and syncrudes.

The silica alumina prepared by the process of the present invention is especially suitable for use as hydrocracking catalyst and more specifically as the second catalyst in a 2 stage hydrocracking process. The latter process comprises contacting a hydrocarbon feedstock in the presence of hydrogen with a first catalyst for hydrotreating and hydrogenation and subsequently with a second catalyst for hydrocracking and further hydrogenation. Each stage can consist of one or more beds of catalysts stacked vertically one above the other and separated by a void spaced into which cold hydrogen gas can be injected as quench. The feedstock preferably is a gas oil and more preferably a vacuum gas oil.

Preferably, the catalyst of the present invention is used in a process for hydrocracking a hydrocarbonaceous feedstock, which process comprises contacting gaseous feedstock at a reaction temperature in the range of 250 to 500° C. and a total pressure at the reactor inlet in the range of from $3\times10^6$ to $3\times10^7$ Pa in the presence of hydrogen with a catalyst according to the present invention in which the gaseous feedstock contains less than 150 parts per million by weight (ppmw) of ammonia. More preferably, the feedstock furthermore comprises less than 150 ppmw of hydrogen sulphide.

The following example is presented to further illustrate certain aspects of the invention, but it is not to be construed as limiting the scope of the invention.

EXAMPLE 1

This Example illustrates the pH swing method according to the present invention and the physical properties of amorphous silica-alumina product made by the pH swing method.

The amorphous silica-alumina powder was prepared using a pH swing precipitation process that included four or five pH swings conducted in a single, so-called strike tank. In the preparation procedure, a water heel was first added to the empty strike tank. Subsequently, aqueous solutions of aluminum sulfate, sodium alumina, and sodium silicate were added in a sequential manner in the order and relative amounts as presented in Tables 1-5 to the liquor contained in the strike tank thereby attaining the liquor pH as also indicated in each of the Tables. Table 1 describes the preparation of Composition A, Table 2 describes the preparation of Composition B, Table 3 describes the preparation of Composition C and Table 4 describes the preparation of Composition D.

Table 5 describes the Comparative Composition prepared according to claim 5 of WO-A-2009/029580 except that the precipitates were washed with alkaline solution instead of water.

The various pH swings were performed at a temperature of approximately 55° C. and a constant agitation rate of 43 rpm. The addition and mixing time for each step approximated five minutes. At the end of the last pH swing, the solids content of the final liquor, or slurry, was around 6 wt %. A 10% wt sodium hydroxide solution having a pH of 9.5 was added to the mixture obtained and the solids were recovered and washed with water. The recovered and washed solids were subjected to ion exchange, washed, and, then, flash-dried to form the final amorphous silica-alumina powder.

TABLE 1

| | | Composition A | | |
|---|---|---|---|---|
| pH Swing | Step No. | Added Component | Relative Mass of Added Component | pH of Liquor after Addition |
| First pH swing | 1 | Water heel | 60.4 | 7 |
| | 2 | Aluminum sulfate | 5.4 | 1.8 |
| | 3 | Sodium aluminate | 3.3 | 8.9 |

TABLE 1-continued

Composition A

| pH Swing | Step No. | Added Component | Relative Mass of Added Component | pH of Liquor after Addition |
|---|---|---|---|---|
| Second pH swing | 4 | Aluminum sulfate | 1.9 | 3.8 |
|  | 5 | Sodium silicate | 5.4 | 8.1 |
| Third pH swing | 6 | Aluminum sulfate | 5.3 | 3.5 |
|  | 7 | Sodium aluminate | 4.0 | 9.4 |
| Forth pH swing | 8 | Aluminum sulfate | 1.9 | 6.4 |
|  | 9 | Sodium silicate | 5.4 | 8.5 |
| Fifth pH swing | 10 | Aluminum sulfate | 4.6 | 4.1 |
|  | 11 | Sodium aluminate | 2.4 | 8.5 |

TABLE 2

Composition B

| pH Swing | Step No. | Added Component | Relative Mass of Added Component | pH of Liquor after Addition |
|---|---|---|---|---|
|  | 1 | Water heel | 64.9 | 7 |
| First pH swing | 2 | Aluminum sulfate | 5.8 | 2.5 |
|  | 3 | Sodium aluminate | 3.5 | 7.8 |
| Second pH swing | 4 | Aluminum sulfate | 2.1 | 3.6 |
|  | 5 | Sodium silicate | 5.8 | 7.7 |
| Third pH swing | 6 | Aluminum sulfate | 5.6 | 3.3 |
|  | 7 | Sodium silicate | 5.8 | 3.8 |
| Forth pH swing | 8 | Sodium aluminate | 4.3 | 10.3 |
|  | 9 | Aluminum sulfate | 2.1 | 7.1 |

TABLE 3

Composition C

| pH Swing | Step No. | Added Component | Relative Mass of Added Component | pH of Liquor after Addition |
|---|---|---|---|---|
|  | 1 | Water heel | 60.4 | 7 |
| First pH swing | 2 | Aluminum sulfate | 5.4 | 1.8 |
|  | 3 | Sodium aluminate | 3.3 | 8.9 |
| Second pH swing | 4 | Aluminum sulfate | 1.9 | 3.8 |
|  | 5 | Sodium silicate | 5.4 | 8.1 |
| Third pH swing | 6 | Aluminum sulfate | 5.3 | 3.5 |
|  | 7 | Sodium aluminate | 4.0 | 9.4 |
| Forth pH swing | 8 | Aluminum sulfate | 1.9 | 6.4 |
|  | 9 | Sodium silicate | 5.4 | 8.5 |
| Fifth pH swing | 10 | Sodium aluminate | 2.4 | 10.4 |
|  | 11 | Aluminum sulfate | 4.6 | 5.4 |

TABLE 4

Composition D

| pH Swing | Step No. | Added Component | Relative Mass of Added Component | pH of Liquor after Addition |
|---|---|---|---|---|
|  | 1 | Water heel | 57.7 | 7 |
| First pH swing | 2 | Aluminum sulfate | 5.1 | 1.8 |
|  | 3 | Sodium aluminate | 3.1 | 8.9 |
| Second pH swing | 4 | Aluminum sulfate | 1.8 | 3.8 |
|  | 5 | Sodium silicate | 5.2 | 8.1 |
| Third pH swing | 6 | Aluminum sulfate | 5.0 | 3.5 |
|  | 7 | Sodium aluminate | 3.8 | 9.4 |

TABLE 4-continued

Composition D

| pH Swing | Step No. | Added Component | Relative Mass of Added Component | pH of Liquor after Addition |
|---|---|---|---|---|
| Forth pH swing | 8 | Aluminum sulfate | 1.8 | 6.4 |
|  | 9 | Sodium silicate | 5.2 | 8.5 |
| Fifth pH swing | 10 | Aluminum sulfate | 4.4 | 4.1 |
|  | 11 | Sodium aluminate | 2.3 | 8.5 |

TABLE 5

Comparative Composition

| pH Swing | Step No. | Added Component | Relative Mass of Added Component | pH of Liquor after Addition |
|---|---|---|---|---|
|  | 1 | Water heel | 64.3 |  |
| First pH swing | 2 | Aluminum sulfate | 6.0 | 3.2 |
|  | 3 | Sodium aluminate | 3.3 | 8.3 |
| Second pH swing | 4 | Aluminum sulfate | 2.1 | 4.1 |
|  | 5 | Sodium silicate | 6.0 | 9.1 |
| Third pH swing | 6 | Aluminum sulfate | 6.2 | 3.6 |
|  | 7 | Sodium aluminate | 4.1 | 9.1 |
| Forth pH swing | 8 | Aluminum sulfate | 2.0 | 6.5 |
|  | 9 | Sodium silicate | 6.1 | 9.6 |

Table 6 shows physical properties of the powders obtained. The new materials display higher surface area compared to the composition prepared according to claim 5 of WO-A-2009/29580.

TABLE 6

Physical properties

| Type | Surface area (m2/g) | Wt. % $Al_2O_3$ | Wt. % $SiO_2$ |
|---|---|---|---|
| Comparative | 234 | 46.3 | 51.6 |
| Sample A | 366 | 53.5 | 45.7 |
| Sample B | 369 | 43.0 | 50.2 |
| Sample C | 355 | 54.5 | 46.3 |
| Sample D | 393 | 55.9 | 44.3 |

EXAMPLE 2

Catalysts A, B and C were prepared by adding water, nitric acid and Methocel cellulose ethers as extrusion aid (Methocel is a trade mark of Dow Chemical Company) to the above Compositions A, B and C. The mixture was mulled in a mix-muller until an extrudable mix was obtained. After the mulling step, the catalysts were extruded into a trilobe shape. The calcination of the final extrudates was carried out by drying at 120° C. for 2 hours and calcination at 600° C. for 2 hours.

The extrudates obtained were impregnated with a homogenized aqueous solution of nickel nitrate and ammonium metatungstate. Citric acid was incorporated into the solution. The impregnated extrudates were dried at ambient conditions in hot circulating air for 1 hour, at 120° C. for 2 hours and finally calcined at 450° C. for 2 hours. The catalysts obtained contained 5% wt of nickel, calculated as nickel oxide, and 21% wt of tungsten, calculated as tungsten oxide.

The catalysts were used in a hydrocracking test under so-called two-stage conditions and compared to a commercial reference catalyst based on co-precipitated amorphous silica alumina and containing 5% wt of nickel, calculated as nickel oxide, and 21% wt of tungsten, calculated as tungsten oxide.

In this design $H_2S$ and $NH_3$ are removed in a fractionator after the first stage allowing very low levels of ammonia in the second stage. The ammonia level of below 150 ppm allows a lower reaction temperature for hydrocracking in the last reactor. These operating conditions are especially beneficial for high diesel selective hydrocrackers with amorphous catalysts.

The hydrocracking performance of the catalysts was assessed in a two-stage simulation tests. The testing was carried out in once-through nanoflow equipment using 0.8 ml of catalyst as extrudates diluted with 0.8 ml of 0.1 mm zirconia particles. The catalysts were presulphided prior to testing.

The feedstock used was a heavy vacuum gas oil as described in Table 7 below. The process conditions comprised a space velocity of 1.5 kg heavy gas oil per litre catalyst per hour ($kg \cdot l^{-1} \cdot h^{-1}$), a hydrogen gas/heavy oil ratio of 1500 Nl/kg. Sulfrzol sulphiding agent (Sulfrzol is a trade mark of Brenntag) was added at an amount of 3.936 $g/kg_{feed}$ to achieve a partial pressure of 0.14 bar $H_2S$ at a total pressure of 140 bar.

TABLE 7

Feed properties

| | |
|---|---|
| Carbon content | 86.63% wt |
| Hydrogen content | 13.37% wt |
| Sulphur (S) content | 0.0175% wt |
| Nitrogen (N) content | 20 ppmw |
| Density 70/4° C. | 0.8459 g · ml |
| Initial boiling point | 172° C. |
| 50% w boiling point | 468° C. |
| Final boiling point | 583° C. |

Hydrocracking performance was assessed at conversion levels between 40 and 90% wt net conversion of feed components boiling above 370° C. To compare activity, the obtained results, expressed as the temperature required to obtain 55% wt net conversion of feed components boiling above 370° C., are shown in Table 8.

TABLE 8

Performance results

| Catalyst | Catalyst A | Catalyst B | Catalyst C | Commercial reference |
|---|---|---|---|---|
| Temperature required (° C.) | 377 | 384 | 386 | 388 |

That which is claimed is:

1. A process for preparing a hydrocarbon conversion catalyst, which process comprises:
    (a) preparing an aqueous mixture containing aluminum sulfate and having a pH in the range of from 1.0 to 6.5;
    (b) adding alkali metal aluminate to the mixture obtained in step (a) to increase the pH of the mixture to within the range of from 7.1 to 12;
    (c) adding aluminum sulfate to the mixture obtained in step (b) to lower the pH of the mixture to within the range of from 1.5 to 6.5;
    (d) adding alkali metal silicate to the mixture obtained in step (c) to increase the pH of the mixture to within the range of from 6.5 to 11,
    wherein the final steps of the preparation process are
    (v) adding aluminum sulfate to the mixture obtained in a process comprising steps (a)-(d) to lower the pH of the mixture to within the range of from 2 to 8;
    (w) adding alkali metal silicate to the mixture obtained in step (v) to increase the pH of the mixture,
    (x) adding to the mixture obtained in step (w) (i) alkali metal aluminate to change the pH of the mixture to of from 7.8 to 12 and (ii) aluminum sulfate to change the pH of the mixture to within the range of from 1.5 to 7.7, wherein step (i) can precede or succeed step (ii),
    (y) treating the mixture obtained in step (x) with an alkali metal hydroxide solution having a pH of from 7.5 to 12,
    (z) recovering a precipitate solid from the mixture obtained in step (y) to provide a recovered precipitate;
    (zz) washing with water the recovered precipitate and drying the recovered and washed precipitate by flash drying, belt drying or spray drying to obtain a dried silica-alumina composition containing of from 30 to 70% wt silica and of from 70 to 30% wt of alumina, and having a surface area of from 320 $m^2/g$ to 450 $m^2/g$, and subsequently shaping the dried silica-alumina composition to provide a shaped silica-alumina composition, and compositing the shaped silica-alumina composition with one or more metals or metal compounds which metals have been selected from the group consisting of Group VIB and Group VIII metals to obtain a hydrocarbon conversion catalyst.

2. A process according to claim 1, which preparation process further comprises
    (e) adding aluminum sulfate to the mixture obtained in step (d) to lower the pH of the mixture to within the range of from 1.5 to 7.0; and
    (f) adding alkali metal aluminate to the mixture obtained in step (e) to increase the pH of the mixture to within the range of from 7.5 to 12.

3. A process according to claim 1, wherein the alkali metal aluminate is sodium aluminate.

4. A process according to claim 1, wherein the alkali metal silicate is sodium silicate.

5. A process according to claim 1, which process comprises calcining the dried silica-alumina composition at a temperature of from 600 to 850° C.

6. A process according to claim 1, which shaping step includes mixing the dried silica-alumina with water and acid to provide an extrusion mixture and subsequently extruding the extrusion mixture to yield the shaped silica-alumina composition.

7. A process according to claim 6, in which process the acid is an inorganic acid.

8. A process according to claim 1, which process further comprises drying and/or calcining the shaped silica-alumina composition.

9. A process according to claim 8, which process comprises calcining the shaped silica-alumina composition at a temperature of from 600 to 850° C.

10. A process for hydrocracking a hydrocarbonaceous feedstock, which process comprises contacting gaseous feedstock at a reaction temperature in the range of 250 to 500° C. and a total pressure at the reactor inlet in the range of from $3 \times 10^6$ to $3 \times 10^7$ Pa in the presence of hydrogen with a catalyst prepared by a process according to claim 1 in which the gaseous feedstock contains less than 150 parts per million by weight of ammonia.

11. A process according to claim 1, wherein the silica-alumina composition obtained in step (z) has a surface area of from 330 m$^2$/g to 420 m$^2$/g.

* * * * *